United States Patent [19]
Kleinfelder

[11] Patent Number: 5,647,482
[45] Date of Patent: Jul. 15, 1997

[54] PACKAGING FOR A COMPACT DISC FROM A BLANK OF FOLDABLE SHEET MATERIAL

[75] Inventor: Wilhelm Kleinfelder, Rosbach-Rodheim, Germany

[73] Assignee: Europa Carton Aktiengesellschaft, Hamburg, Germany

[21] Appl. No.: 351,272

[22] PCT Filed: Sep. 4, 1993

[86] PCT No.: PCT/EP93/02395

§ 371 Date: Dec. 6, 1994

§ 102(e) Date: Dec. 6, 1994

[87] PCT Pub. No.: WO94/22742

PCT Pub. Date: Oct. 13, 1994

[30] Foreign Application Priority Data

Apr. 7, 1993 [DE] Germany ............... 9305332 U

[51] Int. Cl.⁶ ............................... B65D 85/57
[52] U.S. Cl. ............ 206/308.1; 206/309; 206/312
[58] Field of Search ................. 206/308.1, 309, 206/311, 312

[56] References Cited

U.S. PATENT DOCUMENTS 4,905,831  3/1990  Bagdis et al. .

FOREIGN PATENT DOCUMENTS

| | | |
|---|---|---|
| 0 503 171 A1 | 9/1992 | European Pat. Off. . |
| 2 234 202 | 1/1995 | France . |
| 2033330 | 7/1970 | Germany . |
| 7411057 | 10/1974 | Germany . |
| 3 82 28 919 | 8/1988 | Germany . |
| 4 01 961 | 6/1978 | Sweden . |
| 1316922 | 6/1987 | U.S.S.R. ............... 206/308.1 |

*Primary Examiner*—David T. Pidei
*Attorney, Agent, or Firm*—Vidas, Arrett & Steinkraus

[57] ABSTRACT

Packaging for a CD from a blank of foldable sheet material with at least two walls hinged together at two transverse sides, whereby at least one wall has attaching means for attaching a CD at an inner surface toward which an adjacent wall is foldable, whereby the wall comprising the attaching means comprises lateral flaps hinged to opposed longitudinal sides, the lateral flaps being foldable toward the inner surface and attachable thereto, and the attaching means have, hinged at the other longitudinal sides of the lateral flaps, attaching flaps which, for segments of an above the inner surface positioned CD, comprise lateral receptacles extending up to their hinge line to the lateral flaps, whereby the attaching flaps in an attaching position folded toward each other cover over the CD and release it in a releasing position folded away from each other.

19 Claims, 1 Drawing Sheet

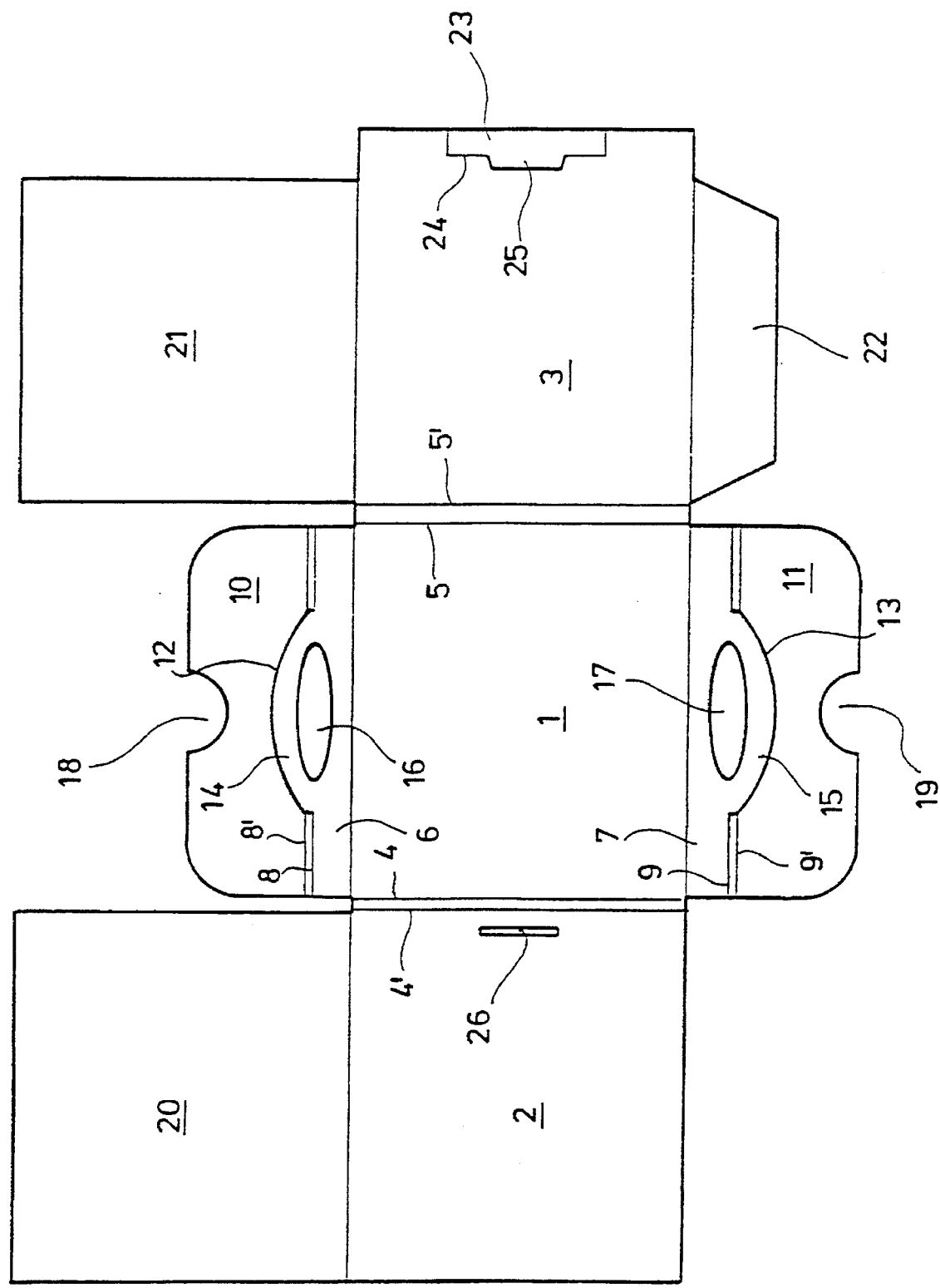

5,647,482

PACKAGING FOR A COMPACT DISC FROM A BLANK OF FOLDABLE SHEET MATERIAL

CROSS REFERENCE TO RELATED APPLICATIONS

This application is U.S. National Stage Application of International Patent application Ser. No. PCT/EP93/02395, filed on Sept. 4, 1993.

BACKGROUND OF INVENTION

1. Field of Invention

Object of the invention is a packaging for a compact disc (CD) from a blank of foldable sheet material according to the preamble of the claim 1 i.e., a packaging for a CD from a blank of foldable sheet material with at least two walls hinged together at two transverse sides, whereby at least one wall has attaching means for attaching a CD at an inner surface toward which an adjacent wall is foldable.

2. Description of Prior Art

For storage of a CD or other data carriers with high storage density which can be optically read out, cassettes of synthetic material are largely common. These have a flat box-shaped bottom part which in a receptacle comprises an arrangement of pivots for holding the CD at a middle hole. The bottom part is closable by means of a cover part which at one end is hinged thereto and at the other end is lockable therewith. These cassettes are relatively expensive. For information of the purchaser, a printed supplement booklet or supplement sheet is inserted into the transparent container.

Moreover, containers have already become known which at least partly consist of cardboard. The DE-GM 90 16 575.6 discloses a protection sleeve for a CD which is formed as slide-in case from cardboard which is merely open at one side edge. Through the side aperture, a rectangular retaining part of synthetic material can be inserted which on one side has a plain recess for reception of a CD. In the middle, the recess has a centering spike for the receiving aperture of the CD and recesses as finger-gripping cutouts passing toward the corners of the retaining part. This storage device is also relatively costly and due to its multipart composition inconvenient in its handling.

Moreover, a packaging for a CD has already become known which has a retaining part of above type adhered to the inner surface of a book-like carrier of cardboard. By opening the sheets of the book, the receptacle for the putting-in and taking-out, respectively, of a CD can be laid bare. Information for the user is printed on the pages of the book.

In addition, ecologically harmless packagings for a CD have already become known consisting exclusively of cardboard. Similar to a sleeve for a conventional audio disc, these can be formed as envelope with a side slit for the inserting and pulling-out of the CD, respectively. Moreover, to a case wall can be hinged a neighbouring wall toward which the other case wall is foldable. With this packaging, the putting-in and taking-out of the CD, respectively, is relatively ponderous and entails a relatively high stress. After the removing of a sheet packaging wrapped around, the CD can undesirably slip out. Besides, it offers only little space for a printing with additional information. Therefore, it is used above all for smaller CD (especially 3.5 inch single-CD).

SUMMARY OF THE INVENTION

Starting out from that, the invention is based on the object to provide an ecologically harmless packaging for a CD which has a relatively modest expenditure, assists in the inserting, secure holding and taking-out of the CD, respectively, and reduces the stress thereof.

The solution of the object is given in claim 1. The subclaims contain advantageous embodiments.

BRIEF DESCRIPTION OF THE DRAWINGS

FIG. 1 is a top plan view of a flatly spread blank of foldable sheet material according to the present invention.

DESCRIPTION OF THE PREFERRED EMBODIMENTS

A packaging according to the invention consists exclusively of foldable sheet material, preferably cardboard. It can be made of an integral blank with relatively modest expenditure. The blank can easily be printed on all sides so that the packaging itself is especially suitable as carrier for user information.

At least one wall of the packaging comprises attaching means. For these, lateral flaps at both the longitudinal sides of the wall are folded toward the inner surface thereof and attached thereto, preferably by adhering. At the other longitudinal sides of the lateral flaps, attaching flaps are hinged swivelling at the wall. The attaching flaps have lateral receptacles for segments of a CD extending up to their hinge line to the lateral flaps. If in an attaching position the attaching flaps are folded toward each other, they cover over the CD positioned at the inner surface so that the CD is secured between lateral receptacles, attaching flaps and wall. With the packaging closed, the attaching flaps are kept pressed against the CD by a neighbouring wall which is folded toward the attaching flaps. In this configuration, the CD cannot fall out by itself.

For the opening of the packaging, the neighbouring wall is opened like the cover of a book. Then, normally the CD cannot leave its position on its own because the attaching flaps are pressed into an attaching position due to internal tensions of the sheet material. It is not before the attaching flaps are folded away from each other into a releasing position that the attaching flaps release the CD in order that it can about vertically be pulled off the wall comprising the attaching means. In doing so, the CD does virtually not slide over its optically effective surfaces so that its taking-out is careful. The inserting in reversed sequence also entails a negligible stress of the sound carrier.

Thus, a packaging according to the invention is produceable from only one material with only relatively modest expenditure, has favourable handling properties and ensures a secure locking and careful treatment of the CD to be received. Due to its good capacity for being printed, product information in form of supplements can be dropped. The packaging is storable similar to a book and is suitable as a durable container for a CD.

The segments of a CD positioned against the inner surface of the wall are arranged above the lateral flaps attached to the inner surface. Therefore, the CD is spaced from the inner surface of the wall with at least one material thickness, whereby the gripping of it at its circumferential portions extending between the lateral flaps is assisted. In addition, the CD can cover supporting portions of the lateral flaps which project above the hinge lines of the attaching flap in the area of the lateral receptacles. Preferably the supporting portions are formed by die-cutouts of the attaching flaps creating the lateral receptacles. Here, the lateral receptacles can be formed about corresponding to the segments of a CD which are to be received, whereby the chords of the segments coincide with the hinge lines of the attaching flaps. In releasing position, the lateral receptacles are just at the outer circumference of the CD segments.

The gripping of the CD from the inner surface of the wall is further facilitated if the lateral flaps have high-embossed portions which are oriented away from their surface foldable toward the wall. The high-embossed portions can be raised by about one material thickness so that the total spacing of the CD from the inner surface can be twice the wall thickness. The high-embossments can be formed in the supporting portions and can be olive-shaped in adjustment to the contour thereof or the supported segment of the CD.

In order that the attaching flaps lie flat on the upper side of the CD, they can have parallel to their hinge lines to the lateral flaps further hinge lines with a spacing of about CD wall thickness. Finger-gripping cut-outs at the free ends of the attaching flap facilitate a folding into releasing position for taking out of the CD.

A wall adjacent to the wall having attaching means can have hinged an inner wall at a longitudinal side, the inner wall being foldable toward the inner surface thereof and attachable thereto. On the one hand, the inner wall produces a reinforcement of the adjacent wall. However, it can also assist in the formation of a pocket in the adjacent wall for which purpose the latter can have hinged a connecting flap at the other longitudinal side, the connecting flap being foldable toward the inner surface thereof and attachable to the inner wall. The pocket can take a supplement booklet which is common for conventional receptacle boxes made of synthetic material. For the taking-out thereof, the inner wall can have a finger-gripping cutout at a transverse side.

In a preferred embodiment, the wall with attaching means has an adjacent wall at a transverse side, the adjacent wall having a pocket and the other transverse side another adjacent wall, the inner wall of which is directly attached to its inner surface without formation of a pocket. The further adjacent wall is preferably folded toward the attaching flaps and the adjacent wall having the pocket toward the further wall from outward.

A double-CD packaging has two walls with attaching means. Here, an adjacent wall can be formed as pocket for a supplement booklet.

Preferably, the hinges of adjacent walls have two hinge lines, the spacing of which corresponds to the total wall thickness of portions of the blank and the CD, respectively, the portions being to be arranged between the adjacent walls. As a result, a flat folding of the packaging is assisted. For a reduction of internal tensions in the hinge lines, these are preferably formed as especially broad scoring lines.

Between walls of the packaging foldable toward each other, a re-fastener can be formed. In a practical embodiment, the re-fastener has, hinged to the edge portion of the outer wall, a locking flap having a locking tongue interrupting the hinge line of the flap, and a locking slit in the wall situated inside, the locking slit corresponding to the locking tongue. As a result, the locking slit can be inserted into the locking slit with the locking flap being about vertically swivelled toward the outer wall. The tongue dips into the slit, whereby the locking flap is swivelled into its starting position parallel to the outer wall and is held due to internal tensions of its hinges.

Preferably, the portions of the blank which are attachable to each other comprise adhesive spots.

Further details and advantages of the invention follow from the following description of the accompanying drawing which shows a flatly spread blank in top plan view.

The blank according to FIG. 1 made of cardboard has three walls 1, 2, 3 which are hinged together at transverse sides. For that purpose, two parallel hinge lines 4, 4' and 5, 5' are provided between adjacent walls 1, 2 and 1, 3, respectively, whereby the spacings of the hinge lines differ from each other.

The middle wall 1 is provided with attaching means. For that purpose, it has hinged lateral flaps 6, 7 at both longitudinal sides. In turn, the longitudinal sides thereof are attached to respective attaching flaps 10, 11 through parallel hinge lines 8, 8' and 9, 9'. The attaching flaps 10, 11 have lateral receptacles 12, 13 shaped like segments of a circle and extending to the hinge lines 8', 9'. From there, the die-cutouts 12, 13 are carried vertically to the hinge lines 8, 9.

At the same time, the die-cutouts 12, 13 forming the lateral receptacles define supporting portions 14, 15 of the lateral flaps 6, 7 which project above the hinge lines 8, 9. The edge flaps 6, 7 have high-embossments 16, 17 with olive contour extending up to the supporting portions 14, 15.

At the free ends of the attaching flaps 10, 11, finger-gripping cutouts 18, 19 are formed in the middle, in form of semi-circle shaped die-cutouts.

The adjacent wall 2 has hinged an inner wall 20 at a longitudinal side.

The other adjacent wall 3 has hinged an inner wall 21 at the one longitudinal side and a connecting flap 22 at the other longitudinal side. The longitudinal extension of inner wall 21 and connecting flap 22 falls a bit below the longitudinal extension of the wall 3. In the projecting portion of the wall 3, in the lateral portion thereof, a locking flap 23 is hinged through a hinge line 24. The hinge line 24 is interrupted by a locking tongue 25, the transverse extension of which corresponds about to that of the slit 26 in the wall 2.

This blank is manufactured and applied as follows:

First of all, a sheet of cardboard is printed on both sides with information of the CD packaging to be made. Then, the blank is die-cut, embossed, grooved and possibly pre-broken. Lying flatly in stacks, the blank is supplied to the user, i.e. to the CD manufacturer.

At the user, the blank is prepared for the receiving of a CD. For this, in one operation the lateral flaps 6, 7 are folded toward the inner surface of the wall 1, the inner wall 20 toward the inner surface of the wall 2 and the connecting portion 22 and the inner wall 21 toward the inner surface of the wall 3. The lateral flaps 6, 7 are sticked together with the wall 1, the inner wall 20 with the wall 2 and the inner wall 21 with the connecting flap 22. Then, between the inner wall 21 and the wall 3 is formed a pocket into which accompanying information can be inserted.

For the insertion of a CD, the attaching flap 10, 11 of the inner surface of the wall 1 is folded toward the lateral flaps 6, 7. Then, a CD can be positioned over the inner surface of the wall 1 onto the high-embossments 16, 17, whereby its circumference fits exactly between the die-cutting lines 12, 13. The supported CD is completely positioned above the wall 1, i.e. has nowhere laterally a projection. Afterwards, the attaching flaps 10, 11 are let off or folded toward inside so that they cover over two portions of the CD opposed to each other and secure the latter on the wall 1. The spacing between the hinge lines 8, 8' and 9, 9', respectively, assists in that the attaching flaps 10, 11 lie flatly on the top side of the CD.

Afterwards, the wall 2 reinforced by the inner wall 20 is folded toward the top side of the attaching flaps 10, 11 and the CD. In doing so, the spacing between the hinge lines 4, 4' assists in that this wall can be oriented parallel to the wall 1. Finally, the wall 3 having the pocket at its inner surface is folded toward the top side of the wall 2. In doing so, the locking flap 23 is swivelled around its hinge line 24 vertically to the wall 3 in order that its locking tongue can be inserted into the slit 26. With progressive approach of the wall 3 toward the wall 2, the locking flap 23 guided at its tongue 25 in the slit 21 returns into its initial orientation according to drawing in which it is held due to its internal tension of its hinge line 24. Then, the closed packaging cannot open up unintendedly.

The opening of the packaging proceeds in reverse sequence. Thus, first the locking flap 23 is put up vertical and the walls 3, 2 are folded away from the wall 1. Afterwards the attaching flaps 10, 11 are folded away from each other and the CD can be taken out toward the top without hindrance.

I claim:

1. A packaging for a CD from a blank of foldable sheet material with at least two walls hinged together at two transverse sides, wherein at least one wall has a first longitudinal side, a second opposing longitudinal side, an inner surface and attaching means for attaching a CD at said inner surface toward which an adjacent wall is foldable, said attaching means comprising a first lateral flap having an inner longitudinal side and a second lateral flap having an inner longitudinal side, said lateral flaps respectively being folded at the first and second opposed longitudinal sides against the inner surface of the at least one wall and are attached to said at least one wall for supporting segments of the CD, said attaching means further comprising a first attaching flap and a second attaching flap for segments of a CD positioned above the inner surface, said first and second attaching flaps being respectively hinged at the first inner longitudinal side and the second inner longitudinal side of the first and second lateral flaps, each said attaching flap comprising a lateral cutout extending up to a first hinge line at the longitudinal side of each said lateral flap, whereby the first and second attaching flaps in an attaching position folded along their respective first hinge lines toward each other cover over the CD and receive the segments of the CD in the cutouts and release the CD in a releasing position folded along their hinge line away from each other.

2. The packaging according to claim 1, characterized in that in the first lateral flap and the second lateral flap each further comprise supporting portions projecting above the hinge lines of the attaching flaps, said supporting portions being proximal to the lateral cutouts of the attaching flaps.

3. The packaging according to claim 2, characterized in that the supporting portions are die-cutouts of the attaching flaps, the die-cutouts being complementary to the lateral cutouts.

4. The packaging according to claim 1 or 2, wherein the lateral cutouts correspond to the segments of a CD which are to be received, said segments of the CD further having chords, whereby chords of the segments coincide with the first hinge lines of the attaching flaps.

5. The packaging according to claim 1 or 2, wherein each lateral attaching flap further comprises a surface folded toward the at least one wall and a high-embossed portion oriented away from the surface folded toward the wall.

6. The packaging according to claim 5, wherein the high-embossed portion of each lateral flap has an olive-shaped contour.

7. The packaging according to claim 1 or 2, wherein the first and second attaching flaps each further comprise a second hinge line parallel to and spaced about a CD-wall thickness from the first hinge lines thereof.

8. The packaging according to claim 1 or 2, wherein the first attaching flap and the second attaching flap each further comprise a free end having a finger-gripping cutouts.

9. The packaging according to claim 1 or 2, wherein the adjacent wall further comprises a hinged inner wall at a first longitudinal side thereof, said inner wall being folded toward the inner surface of said adjacent wall and attached thereto.

10. The packaging according to claim 1 or 2, wherein the adjacent wall further comprises:

a hinged inner wall at a first longitudinal side thereof, said inner wall being folded toward the inner surface of said adjacent wall; and a hinged connecting flap at a second longitudinal side thereof, said connecting flap being folded toward the inner surface of said adjacent wall, the inner wall and connecting flap being adhered together to form a pocket attached to the inner wall.

11. The packaging according to claim 10, wherein the inner wall has a finger-gripping cutout at a transverse side thereof.

12. The packaging according to claim 10 further comprising a second adjacent wall foldable toward the inner surface of the at least one wall, said second adjacent wall further comprising a hinged inner wall at a first longitudinal side thereof, said inner wall being folded toward an inner surface of said second adjacent wall and attached thereto.

13. The packaging according to claim 1 or 2 wherein two walls have attaching means.

14. The packaging according to claim 13, wherein:

a) the adjacent wall further comprises:

a hinged inner wall at a first longitudinal side thereof, said inner wall being folded toward the inner surface of said adjacent wall; and a hinged connecting flap at a second longitudinal side thereof, said connecting flap being folded toward the inner surface of said adjacent wall, the inner wall and connecting flap being adhered together to form a pocket attached to the inner wall; and b) the packaging further comprises a second adjacent wall having attaching means.

15. The packaging according to claim 1 or 2, wherein a hinge between transverse walls thereof has two parallel hinge lines, said parallel hinge lines being spaced apart a distance which corresponds to a total wall thickness of the portions of the blank and the CD to be arranged between transverse walls.

16. The packaging according to claim 1 or 2, wherein the hinge lines are scoring lines.

17. The packaging according to 1 or 2, further comprising a re-fastener formed between walls of said packaging folded toward each other.

18. The packaging according to claim 17, characterized in that the re-fastener comprises, a locking flap hinged to the edge portion of an outer wall, said locking flap having a locking tongue interrupting the hinge line of said locking flap, and a locking slit in an inner wall, said locking slit being positioned to correspond with the locking tongue, whereby the outer wall is folded toward the inner wall.

19. The packaging according to claim 1 or 2, wherein portions of the blank which are attached to each other by adhesive spots.

* * * * *

UNITED STATES PATENT AND TRADEMARK OFFICE
CERTIFICATE OF CORRECTION

PATENT NO. : 5,647,482

DATED : July 15, 1997

INVENTOR(S) : Wilhelm Kleinfelder

It is certified that error appears in the above-identified patent and that said Letters Patent is hereby corrected as shown below:

Col. 6, line 5, delete "cutouts" and insert -- cutout --;

Col. 6, line 64, delete "which".

Signed and Sealed this

Seventh Day of October, 1997

*Attest:*

BRUCE LEHMAN

*Attesting Officer*     *Commissioner of Patents and Trademarks*